(12) United States Patent  (10) Patent No.: US 7,373,886 B2
Zätterqvist et al.  (45) Date of Patent: May 20, 2008

(54) DISPENSER FOR DISCHARGING COUNTERMEASURES AND METHOD THEREFORE

(75) Inventors: Christer Zätterqvist, Uppsala (SE); Johan Friede, Hässelby (SE)

(73) Assignee: SAAB AB, Linköping (SE)

( * ) Notice: Subject to any disclaimer, the term of this patent is extended or adjusted under 35 U.S.C. 154(b) by 500 days.

(21) Appl. No.: 10/476,758

(22) PCT Filed: May 3, 2002

(86) PCT No.: PCT/SE02/00851

§ 371 (c)(1), (2), (4) Date: May 19, 2004

(87) PCT Pub. No.: WO02/093102

PCT Pub. Date: Nov. 21, 2002

(65) Prior Publication Data

US 2004/0200382 A1  Oct. 14, 2004

(30) Foreign Application Priority Data

May 7, 2001 (SE) .................................. 0101581
Feb. 27, 2002 (SE) .................................. 0200597

(51) Int. Cl.
  *F42B 12/70* (2006.01)
(52) U.S. Cl. ........................ 102/505; 102/340; 102/342
(58) Field of Classification Search ................ 102/505, 102/334, 342, 340, 504; 89/1.51; 342/12; 221/93, 95, 252, 258
See application file for complete search history.

(56) References Cited

U.S. PATENT DOCUMENTS

| 3,455,484 | A | * | 7/1969 | Edwards .................... 221/222 |
| 3,674,174 | A | * | 7/1972 | Crewe ........................ 221/87 |
| 3,808,941 | A | * | 5/1974 | Biggs ........................ 89/1.51 |
| 3,899,975 | A | * | 8/1975 | Lawrence ................... 102/505 |
| 4,134,115 | A | * | 1/1979 | Strom ........................ 342/12 |
| 4,397,433 | A | * | 8/1983 | Guitaut et al. ........... 244/137.4 |
| 4,417,709 | A |   | 11/1983 | Fehrm |
| 4,586,439 | A |   | 5/1986 | Wrana |
| 4,650,092 | A |   | 3/1987 | Andersson et al. |
| 4,763,127 | A | * | 8/1988 | Sallee ........................ 342/12 |
| 4,796,536 | A | * | 1/1989 | Yu et al. .................... 102/505 |
| 4,941,392 | A |   | 7/1990 | Huetter |
| 5,063,823 | A | * | 11/1991 | Marshall et al. ............. 89/1.51 |
| 5,271,523 | A | * | 12/1993 | Nasvall et al. ............. 221/185 |
| 5,381,721 | A |   | 1/1995 | Holmstrom et al. |

(Continued)

FOREIGN PATENT DOCUMENTS

DE  2522927 B1  11/1976

(Continued)

*Primary Examiner*—Michael J. Carone
*Assistant Examiner*—Stewart T Knox
(74) *Attorney, Agent, or Firm*—Venable LLP; Eric J. Franklin

(57) ABSTRACT

A method and an arrangement for discharging countermeasures from a carrier craft in the form of an aircraft or equivalent. The countermeasures are intended to be spread initially in the form of unit packs that, after they have left the carrier craft, are to screen the same from missiles approaching is guided by built-in sensors, or other threats. It is especially characteristic of the invention that the unit countermeasure packs are spread from the carrier transversely to the lying direction of the carrier craft.

26 Claims, 3 Drawing Sheets

U.S. PATENT DOCUMENTS

Figure 1:
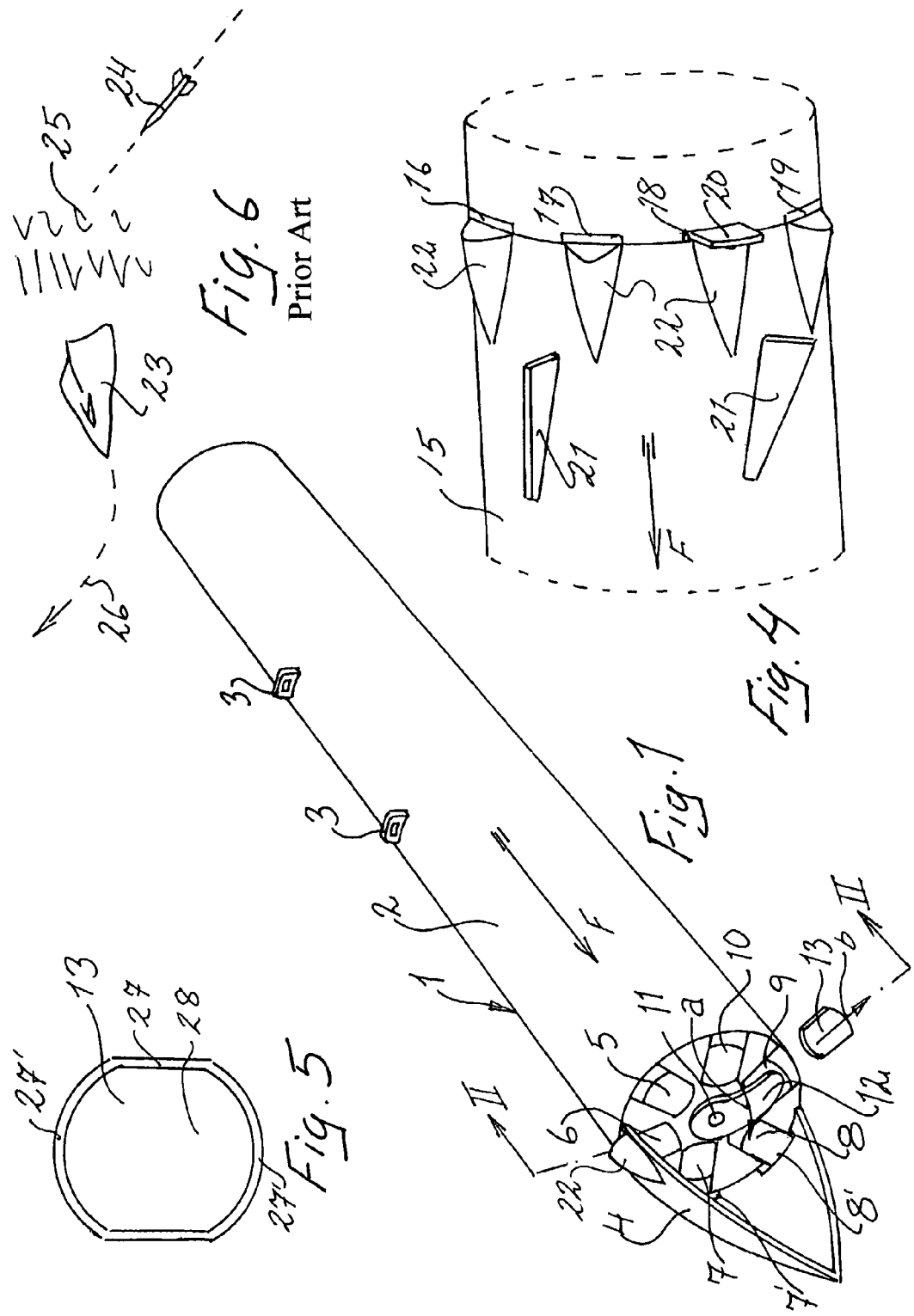
Figure 2:
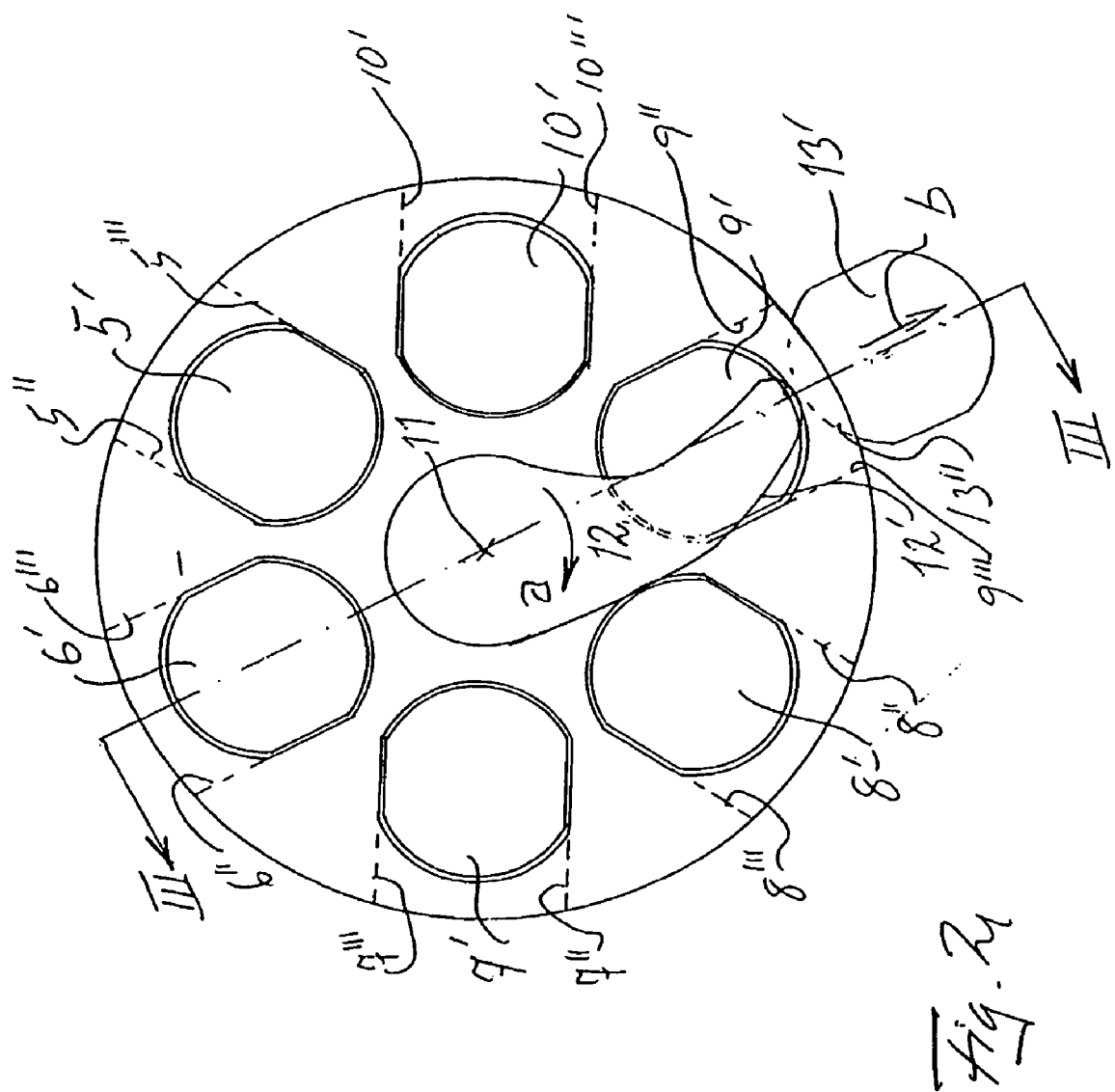

| | | | | |
|---|---|---|---|---|
| 5,445,078 A | * | 8/1995 | Marion | 102/505 |
| 5,499,582 A | * | 3/1996 | Schiessl et al. | 102/334 |
| 5,602,362 A | * | 2/1997 | Billard et al. | 102/357 |
| 6,055,909 A | * | 5/2000 | Sweeny | 102/336 |
| 6,499,407 B2 | * | 12/2002 | Brum | 102/505 |
| 6,666,351 B1 | * | 12/2003 | Hartz et al. | 221/258 |
| 2004/0200381 A1 | * | 10/2004 | Zatterqvist | 102/505 |

FOREIGN PATENT DOCUMENTS

| | | | | |
|---|---|---|---|---|
| FR | 000322269 A1 | * | 6/1989 | 221/258 |
| GB | 2300036 A | | 10/1996 | |
| GB | 2353087 A | | 2/2001 | |
| SE | 446771 B | | 10/1986 | |
| SE | 469196 B | | 5/1993 | |

* cited by examiner

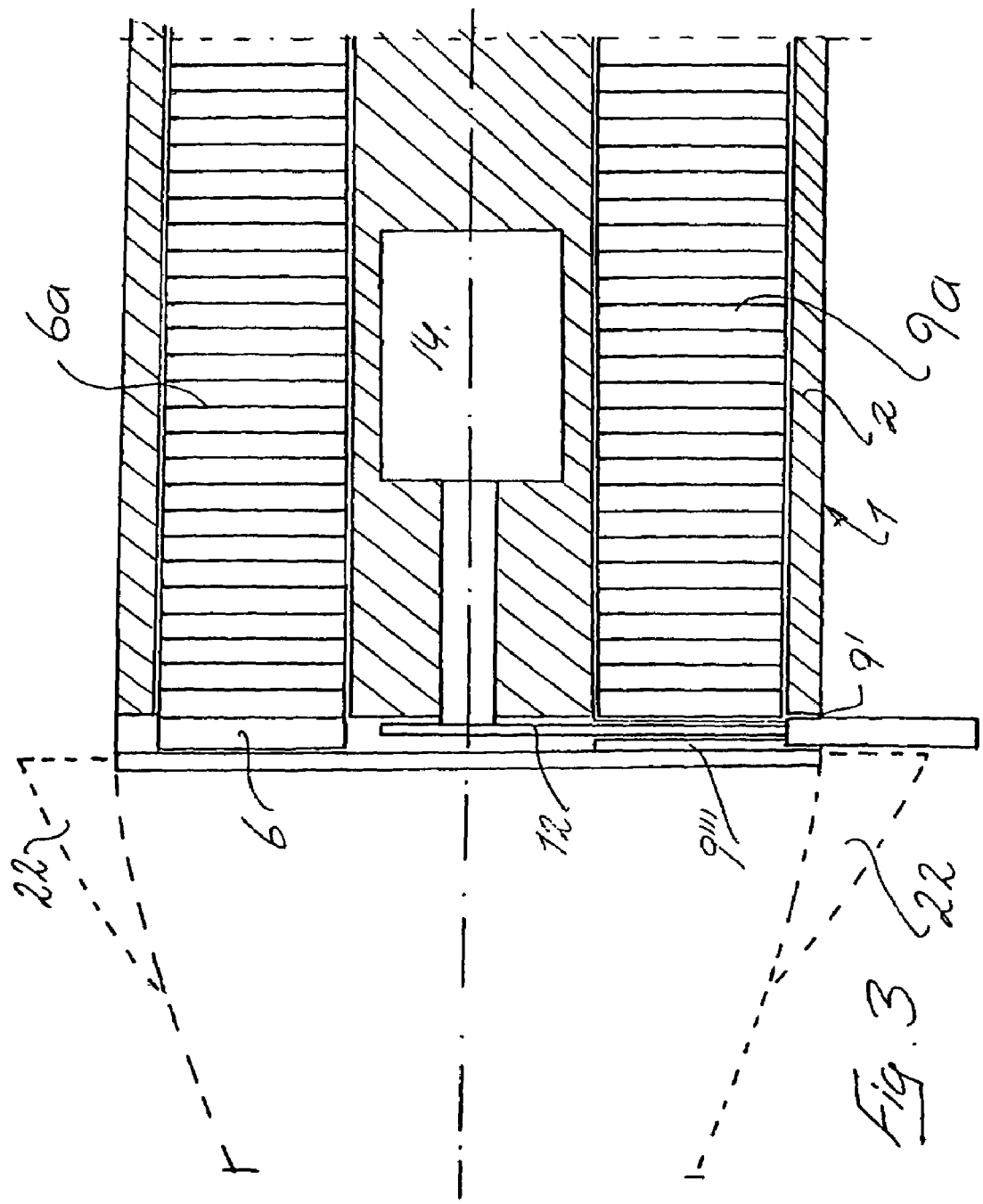

DISPENSER FOR DISCHARGING COUNTERMEASURES AND METHOD THEREFORE

CROSS-REFERENCE TO RELATED APPLICATIONS

This application claims priority to Swedish patent applications 0101581-7 filed 7 May 2001 and Swedish patent application 0200597-3 filed 27 Feb. 2002 and is the national phase under 35 U.S.C. § 371 of PCT/SE02/00851 filed 3 May 2002.

FIELD OF THE INVENTION

The present invention relates to a method for discharging countermeasure means, such as radar chaff or hot IR chaff, laser reflectors or equivalent from an electromechanical dispenser arrangement. The invention also relates to a dispenser arrangement designed in accordance therewith.

BACKGROUND OF THE INVENTION

The most serious threat to modern fighter aircraft and transport aircraft is the self-guiding missile equipped with radar, IR or laser sensors, which can be fired either from enemy aircraft or from the ground. In order to protect own aircraft, these are therefore now normally provided with equipment so as to be capable, when they are attacked or fear attack, of dispensing various types of countermeasure means. An example of such equipment is the BOL dispenser produced and patented by ourselves. In this connection, reference may be made to our U.S. Pat. Nos. 4,417,709 and 4,650,092. By means of this type of dispenser, the dispensing of countermeasure means can be simply controlled and adapted to the threat situation existing at the time. A very common form of our dispenser, which is of electromechanical type, is the kind which is built into the load-bearing beam of the aircraft and can therefore serve as a mounting for other load at the same time. This type of countermeasure dispenser, which has become widely used within a large number of different air forces, nevertheless has the disadvantage that the quantity of countermeasure means it can contain is limited by the normal outer dimensions of the load-bearing beam. Given that the various sensors of the missiles are becoming increasingly sophisticated, however, demands are becoming more exacting with regard to the quantity of countermeasure means necessary for each protective action and the rapidity with which the countermeasure means have to be spread in order for it to be possible for the sensors of an attacking missile to be deceived and the own aircraft to manage to move out of the way. At the same time, access to various missile weapons has increased markedly, as a result of which the need for it to be possible to perform more or longer protective actions within one and the same mission has increased to a corresponding extent.

SUMMARY OF THE INVENTION

The present invention therefore relates to an improved discharging method and an improved type of spreader for countermeasure means adapted for a greater quantity of countermeasure means carried, which thus makes possible more or longer countermeasure actions one after another. The countermeasure types principally concerned in this connection are conventional radar chaff made chiefly from aluminized foil or fibres, hot IR chaff, and also laser-reflecting fibres or foils.

With the present invention, a cloud or a screen of protective means is therefore produced around the carrier aircraft by means of a method which involves unit-packed countermeasure means being spread successively but in one and the same operation from a number of magazines arranged parallel to one another, spreading taking place in a laterally directed manner transversely to the flying direction of the aircraft serving as the carrier. In this connection, each magazine is given its own discharging direction which preferably extends radially outwards from a common main axis, the discharging directions also being uniformly distributed all the way around. As the unit packs are designed in such a manner that, as soon as they have left the spreader, they will be broken up by the relative wind and thus in turn spread their contents, a protective cloud is thus produced rapidly, which conceals the carrier aircraft and confuses missiles aimed at it.

Inside each magazine included in the arrangement according to the invention, a simple feed spring, for example, can serve for feeding the unit countermeasure packs to a discharging location specific to the magazine in question. Provided that the discharging locations of all the magazines are arranged in one and the same transverse plane arranged transversely to the flying direction of the aircraft, one and the same rotating discharger or ejector can be used for successively, as it passes the magazines, ejecting the countermeasure pack next in order located there. If it is desirable to use this variant, the various magazines should therefore be arranged parallel to one another around a centre axis, the centre axis also constituting a bearing point for the rotating discharger which can itself be in the form of a cam which, during its rotation past a countermeasure pack present in each discharging location, moves the pack in the discharging direction until it has completely left the discharging location. In order to bring about the desired radial discharge, the various countermeasure packs should also be guided up in the desired discharging direction until the moment when these have completely left the spreader. In this connection, the various countermeasure packs are preferably arranged stacked on top of one another in the magazines, with their respective greatest extents lying in the lateral direction transversely to the feed direction of the dispenser. The spreading of the countermeasure packs is thus carried out in the longitudinal direction of the packs, that is to say transversely to the feed direction of the magazines.

The spreader arrangement described above in terms of its basic principles therefore comprises a number of magazines arranged parallel to one another around a central axis, and an ejector arranged rotatably about this axis. It should be possible for the whole of this arrangement, without major problems, to be built into one of the rocket capsules intended for originally unguided attack rockets, which are available in great numbers for most combat and transport aircraft in service today. This could be a good use for at least some surplus rocket capsules, of which there must be many because, in the current situation with existing anti-aircraft missiles, it is only entirely unprotected targets which are likely to be attacked using unguided attack rockets. If rebuilding such a rocket capsule for this purpose is anticipated, it may be necessary to manufacture a new nose cone for the capsule because the nose cone, in the original state, is often discarded before the rockets are fired, but, when used as a countermeasure dispenser, the nose cone needs only to be provided with discharger openings adapted to the intended dispensing directions, if the dispensing of countermeasure means takes place in the front part of the dispenser.

A further improvement of the spreading of countermeasure means can also be brought about by arranging angled swirl plates in close proximity to the discharging openings through which the countermeasure packs leave the spreader. By means of such swirl plates, a turbulent air flow is brought about just around the discharging opening of the spreader, and the spreading of the countermeasure means itself is thus improved as soon as it has left its unit pack. Especially in the case of rapid combat aircraft, it will probably also be suitable to arrange some sort of wind deflector in the flying direction of the plane in front of each discharging opening, because the unit packs could otherwise, in spite of high discharging speed, be broken by the relative wind even before they have completely left their discharging opening. In this connection, these wind deflectors can be in the form of a bellied projection, a guide rail in the form of an angled plate or equivalent.

As already indicated, the dispenser arrangement according to the invention can be contained in a carrier with in principle the same outer configuration as conventional rocket launchers or consisting of a rebuilt rocket launcher of such a type, of which there have long been great quantities intended for all combat and transport aircraft in service. The carrier is therefore in the form of an oblong cylindrical capsule, and this shape provides room for a number of magazines arranged side by side extending in the longitudinal direction of the capsule and also a drive arrangement, arranged centrally in the middle of the capsule, for a rotating discharger which, when it is activated, during its rotation successively ejects one after another the unit countermeasure packs which lie next in order in the discharging locations of the magazines. The actual discharging of the unit countermeasure packs, which according to the invention is to take place radially in relation to the longitudinal axis of the carrier capsule, can of course be arranged in either the front or the rear end of the carrier capsule and/or somewhere in between.

In an especially preferred arrangement, magazines of standard countermeasure packs are therefore arranged around a central space, in which the drive arrangement for the rotating discharger is arranged, and, at the same time, each of the magazines is provided with its own discharging location, and all these discharging locations are positioned in a common plane which is arranged transversely to the discharging direction of the magazines and in which the discharger also rotates when it is activated. With this setup, a single discharger can therefore serve all the magazines by, during its rotation, successively passing the discharging locations of the various magazines. Each magazine then has its own guide path for controlling the general ejection of the countermeasure packs, while the feed of the unit packs within each magazine can be effected by means of separate feed springs or by a common ball screw which, by means of separate feed arms, effects the feed of the countermeasure packs within all the magazines.

The packs can contain previously known types of interference material and reflective material as mentioned above, and, when these packs have left the spreader, they open and form material clouds capable of diverting the threat concerned.

BRIEF DESCRIPTION OF THE DRAWINGS

The invention is not limited to the embodiments shown above by way of example but can undergo modifications within the scope of the patent claims below.

The invention will be described in greater detail below by means of illustrative embodiments with reference to accompanying drawings, in which:

FIG. 1 shows a spreader for countermeasure means with a partly cut-away nose cone, FIG. 2 shows on larger scale a cross section along the line II-II in FIG. 1, FIG. 3 shows the section III-III in FIG. 2, FIG. 4 shows a special type of wind deflector at the discharging openings as protection during discharging, and swirl plates for improving the spreading of the countermeasure means, FIG. 5 shows a unit countermeasure pack, and FIG. 6 shows in a general manner the use of the arrangement according to the invention.

DETAILED DESCRIPTION OF EMBODIMENTS OF THE INVENTION

The spreader 1 for countermeasure means shown in FIG. 1 has a circular cylindrical main body 2 with mounting and connecting eyes 3 and also a partly cut-away front nose cone 4, inside which it is possible to observe the discharging locations 5-10 for six different magazines which are arranged in the longitudinal direction of the body and have been given the references 5*a*-10*a* although only 6*a* and 9*a* are actually visible in FIG. 3. FIGS. 1, 2 and 3 also show a discharger 12 which can rotate about a central axis 11 and, when it rotates past the discharging location of each magazine in the direction of the arrow a, accelerates a unit countermeasure pack 13 present there in the radial direction to a sufficient speed for the latter to leave the countermeasure spreader via a discharging opening 5'-10' corresponding to the magazine concerned. The discharging direction of the unit pack 13 is indicated by the arrow b in FIG. 2.

For further details, reference is also made to FIG. 2 and FIG. 3 in addition to FIG. 1, corresponding components having the same references irrespective of the different scale of the figures. The rotating discharger 12 therefore has a curved front edge 12' which, during its rotation, is brought into contact with the curved inner edge, here 13", of the unit countermeasure pack 13'. By virtue of the front edge 12' of the discharger being designed in such a manner that its contact with the curved end edge 27' (see FIG. 5) of the unit pack is progressively displaced from its outer edge towards its centre during continuous lengthening of the lever formed by the discharger from its centre of rotation to the edge of the pack, the unit pack will be moved in the discharging direction until it completely leaves the spreader.

As can be seen from FIG. 2 and, to a lesser extent, from FIG. 3, guide edges 5"-10" and 5'"-10'" are arranged along the discharging directions originating from each magazine. Furthermore, the direction of rotation of the discharger 12 is designated by a, and the discharging direction of the countermeasure pack 13 and 13' by b.

In FIG. 3, the drive motor 14 of the discharger 12 is also shown.

As far as FIG. 4 is concerned, this figure shows a variant in which the discharging opening of each magazine is arranged along a cylindrical part of the carrier body 15. Also shown are four discharging openings 16-19 for spreading countermeasure means, a unit countermeasure pack 20 on the way out of the opening 18, and two swirl plates 21 arranged close to the discharging openings for the purpose of increasing the turbulence in the air next to the discharging openings in order in this way to speed up the spreading of the countermeasure means. There are also wind deflectors in the form of projections 22 arranged on the wind side or the side facing the air flow at each of the discharging openings 16-19. The purpose of these wind deflectors is to prevent the inherently very delicate unit packs being broken before they have had time completely to leave the spreader. In the figures, these wind deflectors have been shown as streamlined projections but they can actually have any shape.

FIG. 5 shows a unit pack 13 of any type of countermeasure means. It consists of an outer frame 27 with curved end edges 27' surrounding a central portion 28 containing countermeasure material, preferably in the form of fine fibres or pieces of foil packed transversely to the main plane of the pack. The intention is that the countermeasure material should leave the frame as soon as the pack has left the spreader.

Finally, FIG. 6 gives a small-scale indication of how the invention is used, even though this is per se previously known art. Accordingly, the aircraft 23 has had a radar-guided missile 24 fired at it and has in this connection spread the countermeasure cloud 25 at the same time as the pilot of the aircraft 23 prepares and performs an evasive maneuver 26. In this connection, the intention is that the missile 24 will then go towards the decoy formed by the countermeasure cloud 25.

The invention claimed is:

1. A method for discharging countermeasures arranged in unit countermeasure packs arranged in a plurality of magazines arranged in a plurality of secondary carriers arranged on a carrier craft moving in a flying direction, the method comprising:

mechanically spreading the unit countermeasure packs from the secondary carriers through discharging locations including laterally facing openings, thereby giving the unit countermeasure packs spreading directions transverse to the flying direction of the carrier craft, wherein the unit countermeasure packs are discharged from a plurality of the discharging locations by a single rotating spreader element that successively passes the plurality of discharging locations, and wherein the countermeasures leave the unit countermeasure packs after the unit countermeasure packs have been discharged from the secondary carriers and screen the carrier craft or form a decoy to deceive or confuse a threat aimed at the carrier craft.

2. The method according to claim 1, wherein the secondary carriers comprise load capsules.

3. The method according to claim 1, wherein the carrier craft comprises an aircraft.

4. The method according to claim 1, wherein the countermeasures comprise radar chaff.

5. The method according to claim 4, wherein the radar chaff comprises aluminized foil, aluminized fibers, hot IR chaff, laser-reflecting fibers or laser-reflecting foils.

6. The method according to claim 1, wherein the unit countermeasure packs are successively radially spread with respect to a common axis from the discharging locations.

7. The method according to claim 6, wherein the spreading directions of the magazines are arranged about the secondary carrier such that they cover at least most of the way around the secondary carrier.

8. The method according to claim 1, wherein a plurality of the discharging locations are arranged in a plane transverse to the flying direction of the carrier craft.

9. The method according to claim 1, wherein the plurality of the discharging locations are arranged in a plane transverse to the flying direction of the carrier craft.

10. The method according to claim 1, wherein the rotating spreader element imparts to the unit countermeasure packs a speed necessary for discharge.

11. An arrangement for discharging countermeasures arranged in unit countermeasure packs on a carrier craft moving in a main flying direction, the arrangement comprising:

a plurality of magazines configured to receive the unit countermeasure packs, each magazine including a discharge opening; and a secondary carrier arranged on the carrier craft and configured to receive the magazines, wherein the magazines are arranged around a central axis of the secondary carrier, the secondary carrier comprising a plurality of discharging locations including openings facing lateral to the main flying direction, the discharging locations configured to discharge the unit countermeasure packs from the magazines in spreading directions transverse to the main flying direction of the carrier craft, such that the countermeasures leave the unit countermeasure packs after the unit countermeasure packs have been discharged from the discharging locations and screen the carrier craft or form a decoy to deceive or confuse a threat aimed at the carrier craft; and a rotating discharger configured to rotate about the central axis such that the rotating discharger successively passes the discharging location of each magazine, thereby imparting to the unit countermeasure packs a necessary discharging speed in a discharging direction for each magazine.

12. The arrangement according to claim 11, wherein the magazines are arranged side by side in the secondary carrier.

13. The arrangement according to claim 11, wherein each magazine discharges unit countermeasure packs from one of the discharge locations.

14. The arrangement according to claim 11, wherein the discharging locations are arranged in a plane.

15. The arrangement according to claim 14, wherein the plane is arranged transverse to the main flying direction of the carrier craft.

16. The arrangement according to claim 11, wherein the secondary carrier comprises a load capsule.

17. The arrangement according to claim 11, wherein the carrier craft comprises an aircraft.

18. The arrangement according to claim 11, wherein the discharging locations are arranged about the secondary carrier such that they cover at least most of the way around the secondary carrier.

19. The arrangement according to claim 11, wherein the rotating discharger comprises a single-bladed or multi-bladed plane propeller including a front edge curved in a direction of rotation, wherein the curved front edge is configured such that as the curved front edge rotates past the discharging location of each magazine the curved front edge strikes a respective unit countermeasure pack with a lever that continuously increases in length during at least a part of the discharge, thereby progressively moving the respective unit countermeasure pack in the discharging direction until the unit countermeasure pack has left the discharging location.

20. The arrangement according to claim 11, wherein unit countermeasure packs have a curved contact surface facing the rotating discharger.

21. The arrangement according to claim 11, wherein the magazines and the rotating discharger are arranged such that the discharge takes place in at least one place along a long side of the secondary carrier, wherein the magazines are arranged in a longitudinal direction of the secondary carrier such that feeding of new unit countermeasure packs from the magazines to the discharging location takes place in or towards the flying direction of the carrier craft.

22. The arrangement according to claim 11, further comprising:

wind deflectors arranged on a wind side of each discharging opening, wherein the wind deflectors prevent the unit countermeasure packs from being broken before the unit countermeasure packs completely exit the discharging openings.

23. The arrangement according to claim 11, further comprising:

angled swirl plates arranged on an outside of the secondary carrier in the vicinity of the discharging openings, wherein the swirl plates facilitate spreading of the countermeasures.

24. The arrangement according to claim 11, wherein the countermeasures comprise radar chaff.

25. The arrangement according to claim 24, wherein the radar chaff comprises aluminized foil, aluminized fibers, hot IR chaff, laser-reflecting fibers or laser-reflecting foils.

26. The arrangement according to claim 11, wherein the discharging openings are arranged in the vicinity of a front of the secondary carrier.

* * * * *